(12) United States Patent
Petivan, III et al.

(10) Patent No.: US 11,599,496 B2
(45) Date of Patent: *Mar. 7, 2023

(54) HARDWARE SYSTEM IDENTIFICATION CIRCUITRY

(71) Applicant: DELL PRODUCTS L.P., Round Rock, TX (US)

(72) Inventors: James L. Petivan, III, Austin, TX (US); Isaac Q. Wang, Austin, TX (US); Yeshaswy Rajupalepu, Austin, TX (US)

(73) Assignee: Dell Products L.P., Round Rock, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/731,604

(22) Filed: Apr. 28, 2022

(65) Prior Publication Data

US 2022/0327090 A1    Oct. 13, 2022

Related U.S. Application Data

(63) Continuation of application No. 17/229,312, filed on Apr. 13, 2021, now Pat. No. 11,347,677.

(51) Int. Cl.
*G06F 13/42* (2006.01)
*G06F 1/3296* (2019.01)

(52) U.S. Cl.
CPC ........ *G06F 13/4282* (2013.01); *G06F 1/3296* (2013.01); *G06F 2213/0016* (2013.01); *G06F 2213/0026* (2013.01); *G06F 2213/0038* (2013.01)

(58) Field of Classification Search
CPC ............... G06F 13/4282; G06F 1/3296; G06F 2213/0038

See application file for complete search history.

(56) References Cited

U.S. PATENT DOCUMENTS

| | | | |
|---|---|---|---|
| 5,530,946 A | 6/1996 | Bouvier et al. | |
| 10,277,228 B1 | 4/2019 | Buch | |
| 11,347,677 B1* | 5/2022 | Petivan, III | ........... G06F 1/3296 |
| 2008/0042701 A1 | 2/2008 | Weiss et al. | |
| 2009/0115428 A1 | 5/2009 | Vyssotski | |
| 2010/0046506 A1 | 2/2010 | Feldman et al. | |
| 2016/0379425 A1 | 12/2016 | Tehranchi | |
| 2017/0293347 A1 | 10/2017 | Wood, III et al. | |

* cited by examiner

*Primary Examiner* — Zachary K Huson
(74) *Attorney, Agent, or Firm* — Larson Newman, LLP

(57) ABSTRACT

An information handling system includes an identification resistor, calibration circuitry, and a system-on-a-chip (SOC). The SOC sets the calibration line to a first digital state to place the calibration circuitry in an inventory mode. While the calibration circuitry is in the inventory mode, the SOC determines an inventory amount of time to charge the capacitor to a voltage substantially equal to a threshold voltage. The SOC then sets the calibration line to a second digital state to place the calibration circuitry in a calibration mode. While the calibration circuitry is in the calibration mode, the SOC determines a calibration amount of time to charge the capacitor to the voltage substantially equal to the threshold voltage. The SOC determines a resistance of the identification resistor based on the inventory amount of time and the calibration amount of time. The SOC also determines bit strapping information corresponding to the determined resistance.

20 Claims, 6 Drawing Sheets

HARDWARE SYSTEM IDENTIFICATION CIRCUITRY

CROSS-REFERENCE TO RELATED APPLICATION

This application is a Continuation of U.S. patent application Ser. No. 17/229,312 entitled "HARDWARE SYSTEM IDENTIFICATION CIRCUITRY," filed on Apr. 13, 2021, the disclosure of which is hereby expressly incorporated by reference in its entirety.

FIELD OF THE DISCLOSURE

The present disclosure generally relates to information handling systems, and more particularly relates to hardware system identification circuitry.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes an identification resistor, calibration circuitry, and a system-on-a-chip (SOC). The SOC may set the calibration line to a first digital state. The calibration circuitry may enter an inventory mode based on the calibration line being at the first digital state. While the calibration circuitry is in the inventory mode, the SOC may set the identification line to the first digital state for a particular amount of time. In response to an expiration of the particular amount of time, the SOC may detect that a capacitor is substantially discharged, and determine an inventory amount of time to charge the capacitor to a voltage substantially equal to a threshold voltage. The SOC may set the calibration line to a second digital state. The calibration circuitry may enter a calibration mode based on the calibration line being at the second digital state. While the calibration circuitry is in the calibration mode, the SOC may set the identification line to the first digital state for the particular amount of time. In response to the expiration of the particular amount of time, the SOC may detect that the capacitor is substantially discharged. The SOC may determine a calibration amount of time to charge the capacitor to the voltage substantially equal to the threshold voltage. The SOC may determine a resistance of the identification resistor based on the inventory amount of time and the calibration amount of time. The SOC also may determine bit strapping information corresponding to the determined resistance.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
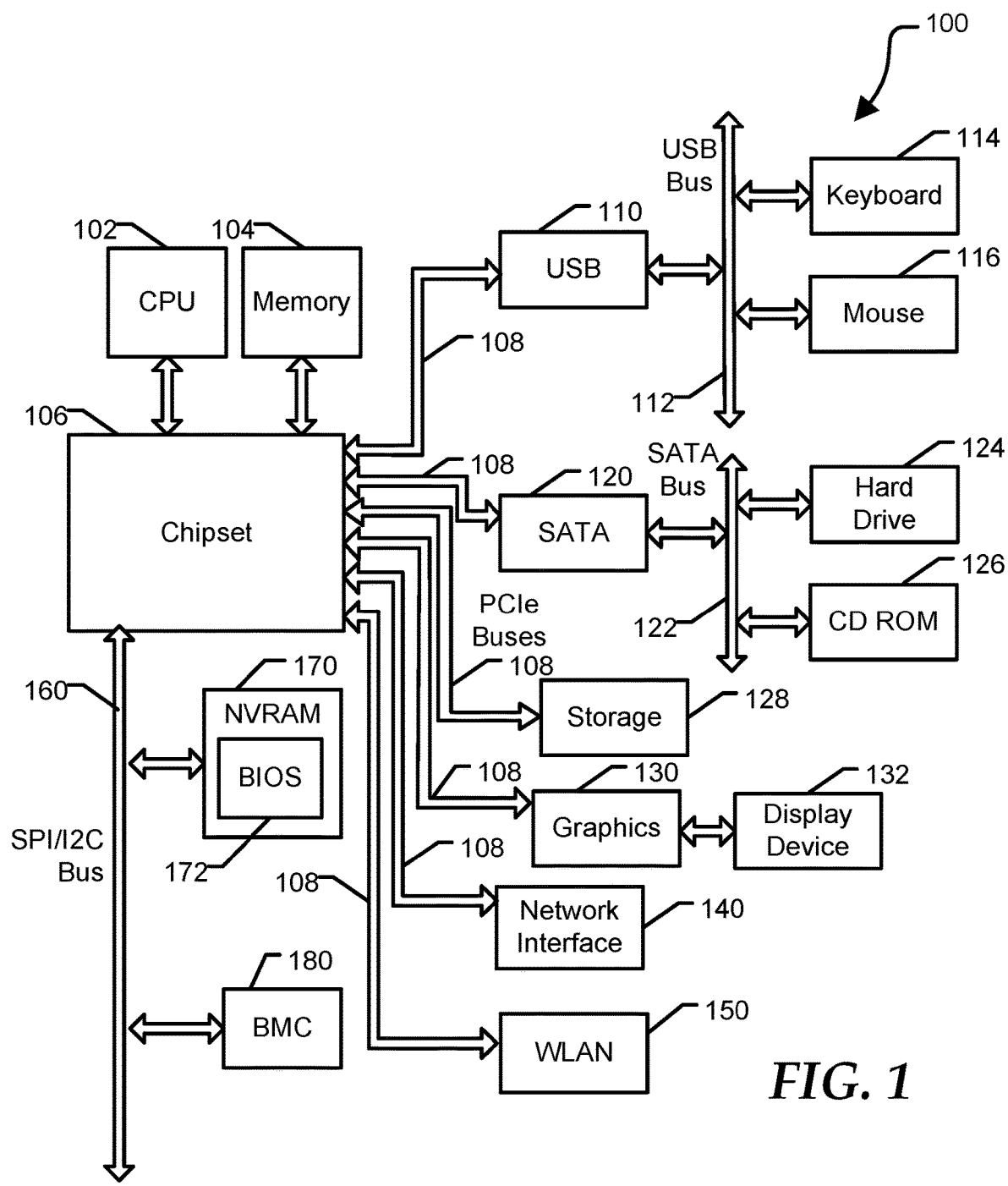
FIG. 1 is a block diagram of a general information handling system according to at least one embodiment of the present disclosure.

FIG. 1 illustrates a general information handling system 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various other I/O devices, such as a keyboard, a mouse, and a video display. The information handling system may also include one or more busses operable to transmit communications between the various hardware components.

Information handling system 100 including a processor 102, a memory 104, a chipset 106, one or more PCIe buses 108, a universal serial bus (USB) controller 110, a USB bus 112, a keyboard device controller 114, a mouse device controller 116, a SATA bus controller 120, a SATA bus 122, a hard drive device controller 124, a compact disk read only memory (CD ROM) device controller 126, a storage 128, a graphics device controller 130, a network interface controller (NIC) 140, a wireless local area network (WLAN) or wireless wide area network (WWAN) controller 150, a serial peripheral interface (SPI) bus 160, a NVRAM 170 for storing BIOS 172, and a baseboard management controller (BMC) 180. In an example, chipset 106 may be directly connected to an individual end point via a PCIe root port within the chipset and a point-to-point topology as shown in FIG. 1. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One or more components can be integrated together. For example, portions of chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Figure 2:
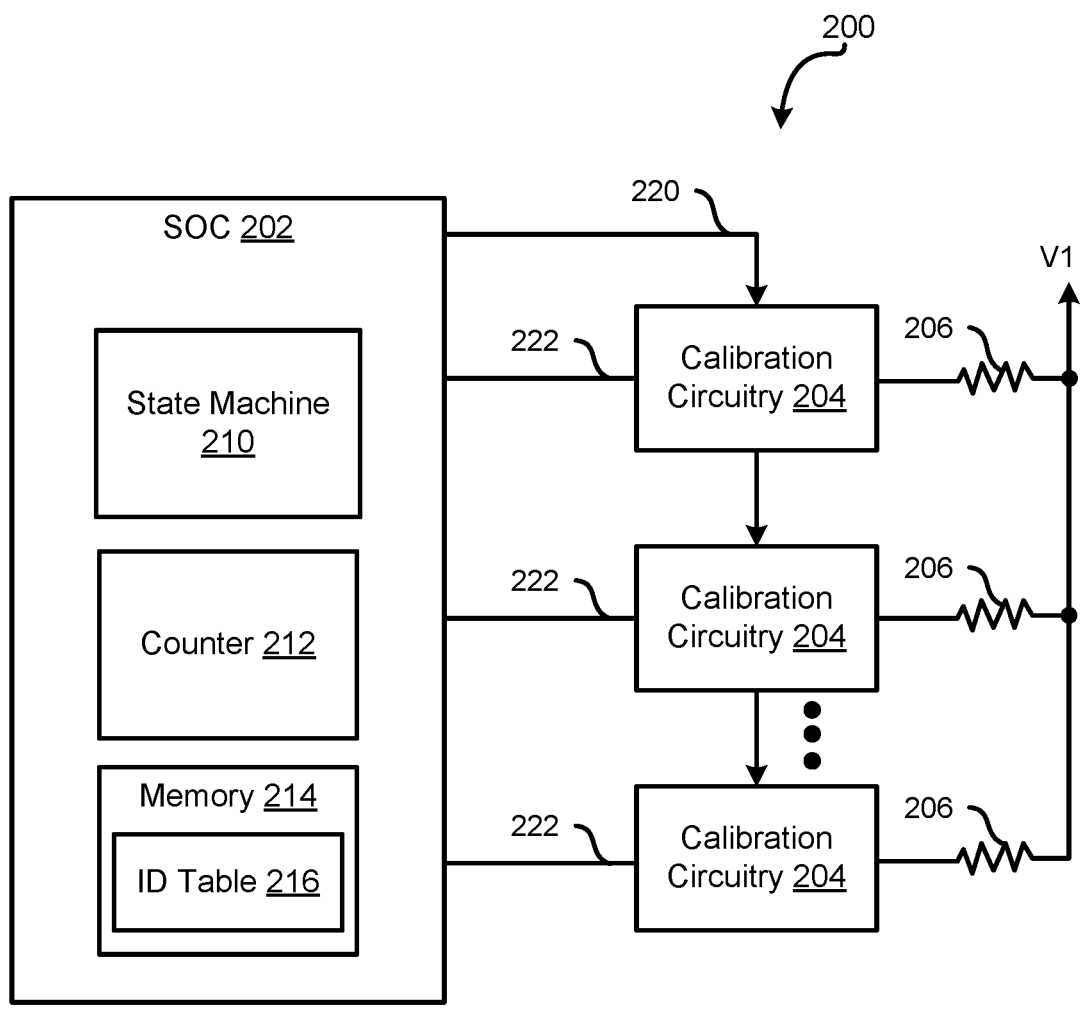
FIG. 2 is a block diagram of a portion of an information handling system according to at least one embodiment of the disclosure.

In an example, information handling system 100 may be any suitable information handling system including, but not limited to, information handling system 200 of FIG. 2. Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

FIG. 2 illustrates a portion of information handling system 200 according to at least one embodiment of the disclosure. Information handling system 200 may be any suitable information handling system including, but not limited to, information handling system 100 of FIG. 1. Information handling system 200 includes a system-on-a-chip (SOC) 202, multiple calibration circuitries 204, and multiple identification resistors 206. SOC 202 includes a state machine 210, a counter 212, and a memory 214. Memory 214 may store any suitable data for SOC 202 including, but not limited to, an identification (ID) table 216. In an example, ID table 216 may be any suitable type of table including, but not limited to, a lookup table. In certain examples, information handling system 200 may include any suitable number of calibration circuitries 204 and any suitable number of corresponding ID resistors 206 to provide any suitable number of bit strapping information.

In an example, state machine 212 of SOC 202 may store any suitable data within ID table 216 including, but not limited to, multiple ID resistor values. In certain examples, each ID resistor value may correspond to a different component ID. In an example, information handling system 200 may include additional components over those shown in FIG. 2 without varying from the scope of this disclosure.

During a calibration cycle, SOC 202 may assert a calibration line 220 to active calibration circuitries 204, which in turn may calibrate the components of the calibration circuitries. SOC 202 also may assert one or more ID lines 222 to provide a current through the corresponding calibration circuitry 204 to further enable the calibration mode. In certain examples, each calibration circuitry 204 may be connected to the same calibration line 220, as shown in FIG. 2, or each calibration circuitry may be connected to a different calibration line. In an example, each calibration circuitry 204 may include a different capacitor to form a resistor-capacitor (RC) strapping circuit with the corresponding ID resistor 206. The capacitor to form a RC strapping circuit with a corresponding ID resistor 206 may be located outside of calibration circuitry 204 without varying from the scope of this disclosure.

During an inventory cycle, SOC 202 may assert one or more ID lines 222 to provide a current through the corresponding ID resistor 206, which in turn may provide a multi-bit ID for a corresponding component of information handling system 200. In an example, the different multi-bit IDs for the different components may be stored within ID table 216 of memory 214. In certain examples, each RC strapping circuit may be utilized to provide different multi-bit strapping information to a management controller of the information handling system 200. In an example, the multi-bit strapping information may be utilized to provide one or more IDs including, but not limited to, TYPE_D, BOARD_ID, and SYSTEM_ID. In certain examples, the calibration and inventory cycles may be performed in any order without varying from the scope of this disclosure.

In previous information handling systems, RC strapping only provide three bits of information per ID resistor. In this situation, as information handling systems increase in component density and platform variations, ID lines that only provide three bits of information, as is the case with previous information handling systems, the addition of more ID bits would require more ID pins, board space, and routing resources. Previous information handling systems cannot provide more than three-bit IDs based on a tolerance stack-up of component parasitics over operating temperature and aging of the information handling system which require larger steps between consecutive strapping values. Calibration circuitries 204 may improve information handling system 200 by utilizing a calibration cycle that eliminates RC tolerances, aging and temperature variances of component parasitics, switching thresholds, and voltage tolerances. This improved calibration cycle enables SOC 202 to provide larger multi-bit information on each ID line 222, which in turn increases the number of components and platform variation that may be identified within information handling system 200.

During operation, SOC 202 may utilize a single digital I/O pin or ID line 222 with a capacitor and an ID resistor 206 for static strapping identification. In certain example, the resistor value for each ID resistor 206 may be almost unlimited. For example, SOC 202 may determine an amount of time to charge/discharge the capacitor through a corresponding ID resistor 206. Based on this amount of time, SOC 202 may perform one or more suitable operations to determine a corresponding multi-bit ID. The operations of SOC 202 may include, but are not limited to, searching in ID table 216 and updating a memory map.

In an example, each calibration circuitry 204 may calibrate out all uncertainties in the corresponding RC strapping circuit to give high-resolution multi-bit strapping information. For example, calibration circuitries 204 may calibrate out all uncertainties and determine the resistance value of a corresponding ID resistor 206 by using two run-time measurements. These run-time measurements may be the time it takes for a known resistor to charge the capacitor, and the time it takes the ID resistor 206 in parallel with the known resistor to charge the capacitor. In this example, the certainty of the unique value, Rid, of ID resistor 206 may provide up to a ten-bit strap value, which in turn may provide 1024 different ID combinations for components within information handling system 200.

In an example, SOC 202 may include firmware that may be utilized to place one of calibration circuitries 204 in either an inventory mode or a calibration mode. For example, SOC 202 may execute the firmware, which may cause the SOC to drive or set calibration line 220 to a low state. In response to calibration line 220 being in the low state, calibration circuitry 300 may be in an inventory mode. SOC 202 then may run through state machine 210 to determine a time (Tid) for ID resistor 206 to charge the associated capacitor. In an example, ID resistor 206 may be in parallel with a calibration resistor (Rcal). In certain examples, state machine 210 may first drive ID pin 222 low to fully discharge the capacitor. State machine 210 then may place ID pin/line 222 in a tri-state and start counter 212 to count a length of time before the ID line is at a high state. In an example, ID line 222 may be in a high state based on the voltage of the ID line being substantially equal to a threshold voltage, Vih. In response to the voltage of ID line 222 being substantially equal to the threshold voltage, SOC 202 stop counter 212. In an example, state machine 210 may store the value of counter 212 in memory 214.

SOC 202 then may execute the firmware to place the calibration circuitries 204 in a calibration mode. For example, SOC 202 may drive or set calibration line 220 to a high state, which in turn place calibration circuitry 204 in the calibration mode. In response to calibration line 220 being set to the high state, ID resistor 206 may be isolated from the rest of calibration circuitry 204. SOC 202 may run through state machine 210 to determine a calibration time (Tcal) for a calibration resistor of calibration circuitry 204 to charge the capacitor of the calibration circuitry. In an example, SOC 202 may utilize the identification time, Tid, and the calibration time, Tcal, to calculate a resistance value of ID resistor 206 as will be described with respect to FIGS. 2 and 3.

In certain examples, the resistance value may be calculated with a high level of accuracy, and independent of the tolerance of the capacitor, the threshold voltage, or the like. For example, SOC 202 may eliminate temperature changes, threshold voltage variations, aging factors as uncertainty variables, and can always arrive at a consistent resistance reading. While described herein, calibration mode is enabled when calibration line 220 is high and the inventory mode is enabled when the calibration line 220 is low, one of ordinary skill in the art will recognize that SOC 202 may enable the calibration mode when calibration line 220 is low and the inventory mode when the calibration line 220 is high without varying from the scope of this disclosure.

Figure 3:
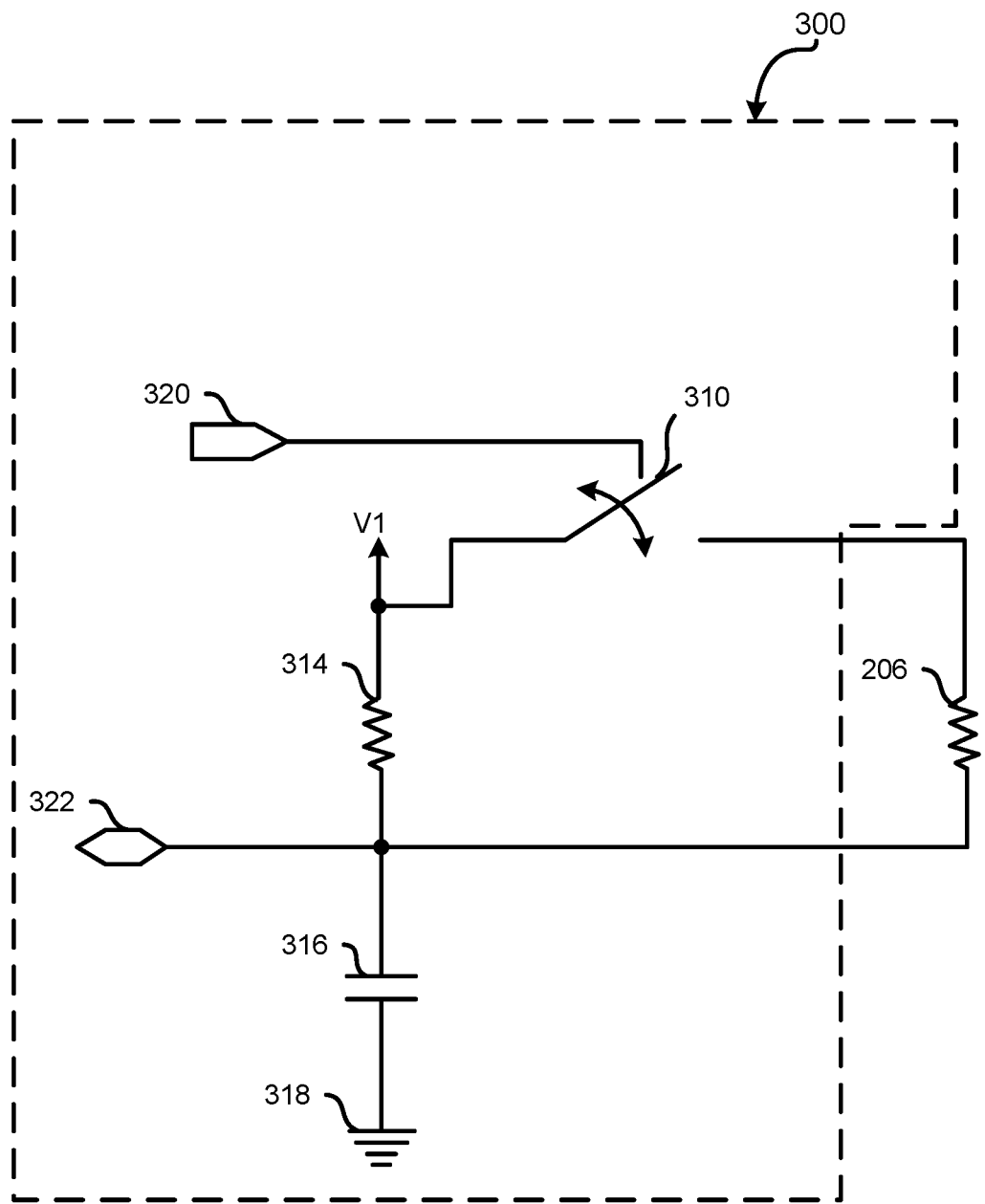
FIG. 3 is a schematic diagram of calibration circuitry and an identification resistor according to at least one embodiment of the disclosure.

Referring now to FIG. 3, calibration circuitry 300 and an ID resistor 206 for an information handling system are illustrated according to at least one embodiment of the disclosure. In an example, calibration circuitry 300 may be any suitable circuitry including, but not limited to, one of calibration circuitries 204 of FIG. 2. Calibration circuitry 300 includes switch 310, a resistor 314, a capacitor 316, a reference voltage 318, a calibration line 320, and an ID line 322. In an example, switch 310 may include any suitable components to control calibration circuitry 300 to switch between the calibration mode and the inventory mode, such as two field-effect transistors (FETs). In an example, reference voltage 318 may be a ground voltage. In certain examples, capacitor 316 and voltage supply, V1, may be located outside of calibration circuitry 300 without varying from the scope of this disclosure. In an example, calibration circuitry 300 may include additional components over those shown in FIG. 3 without varying from the scope of this disclosure. In certain examples, other variants of calibration circuitry 300 may provide the same functionality without departing from the scope of this disclosure.

As described above with respect to FIG. 2, a SOC, such as SOC 202 of FIG. 2, may place calibration circuitry 300 in either an inventory mode or a calibration mode. For example, in response to calibration line 320 being set to a low state, calibration circuitry 300 may be placed in an inventory mode. While in the inventory mode or cycle, the low state of calibration line 320 may cause switch 310 to place ID resistor 206 in parallel with calibration resistor 314.

In an example, voltage supply, V1, may be any suitable voltage, calibration resistor 314 may be any suitable known resistance, and capacitor 316 may be any suitable capacitance. In certain examples, ID resistor 206 may be any suitable resistance within a range of resistances and each resistance may correspond to a different multi-bit strapping identification value. In an example, the multi-bit strapping identification value may be an eight-bit identifier, such that the multi-bit strapping identification value may range from 0-255.

During an inventory cycle of the inventory mode, SOC 202 may drive ID pin 322 to a low state, which in turn may discharge capacitor 316. In response to capacitor 316 being fully discharged, SOC 202 may place ID pin 322 in an unknown or tri-state and may start counter 212 of FIG. 2. SOC 202 may then enable capacitor 316 to charge through the parallel combination of calibration resistor 314 and ID resistor 206. The amount of time, Tid, to charge capacitor 316 may be calculated as follows in equations 1 and 2 below:

$$Vid=V1*(1-\exp(-t/(Rcal\|Rid)/C)) \quad \text{EQ 1:}$$

$$Tid=-\ln((V1-Vt)/V1)*(Rcal\|Rid)*C \quad \text{EQ. 2:}$$

In equations 1 and 2 above, Vid is the voltage of ID pin 322, such as the voltage of capacitor 316, Rcal is the resistance value of calibration resistor 314, Rid is the resistance value of ID resistor 206, C is the capacitance value of capacitor 316, Tid is a length of time for the voltage of ID pin 322 to reach a threshold voltage, V1 is a power rail voltage, and Vt is a threshold voltage. In equations 1 and 2, (Rcal∥Rid) is the resistance calculated based on parallel resistances of calibration resistor 314 and ID resistor 206. Based on capacitor 316 being charged to the threshold voltage while calibration circuitry 300 is in the inventory mode, SOC 202 may utilize counter 212 to determine an inventory time, Tid.

In an example, SOC 202 may assert calibration line 320 to a high state to place calibration circuitry 300 in the calibration mode. In response to calibration line 320 being asserted in the high state, switch 310 may isolate ID resistor 206 from calibration circuitry 300. In an example, one transistor of switch 310 may be placed in closed state, which in turn will pull the gate of another transistor in the switch to voltage reference 318. Voltage reference 318 is a ground voltage, such that transistor 312 is placed in an open state, and ID resistor 206 is isolated from calibration circuitry 300. During a calibration cycle, SOC 202 may drive ID pin 322 to a low state, which in turn may discharge capacitor 316. In response to capacitor 316 being fully discharged, SOC 202 may place ID pin 322 in an unknown or tri-state and may start counter 212 of FIG. 2. SOC 202 may then enable capacitor 316 to charge through calibration resistor 314. The amount of time, Tcal, to charge capacitor 316 may be calculated as follows in equations 3 and 4 below:

$$Vid=V1*(1-\exp(-t/Rcal/C)) \quad \text{EQ. 3}$$

$$Tcal=-\ln((V1-Vt)/V1)*Rcal*C \quad \text{EQ. 4}$$

In equations 3 and 4 above, Vid is the voltage of ID pin 322, such as the voltage of capacitor 316, Rcal is the resistance value of calibration resistor 314, C is the capacitance value of capacitor 316, Tcal is a length of time for the voltage of ID pin 322 to reach a threshold voltage, V1 is a power rail voltage, and Vt is a threshold voltage. Based on capacitor 316 being charged to the threshold voltage while calibration circuitry 300 is in the calibration mode, SOC 202 may utilize counter 212 to determine a calibration time, Tcal. In an example, the capacitance value for capacitor 316 may be determined by solving for the capacitance, C, as shown in equation 5 below:

$$C=-Tcal/\ln((V1-Vt)/V1)/Rcal \quad \text{EQ. 5}$$

In response to solving for the capacitance, C, of capacitor 316, the capacitance, C, may be substituted into the calculation of Tid in equation 2 above. In an example, solving for Tid may be performed in any suitable manner including, but not limited to, the steps below:

$$\begin{aligned}Tid &= -\ln\bigl((V1-Vt)/V1\bigr)*(Rcal\|Rid)*C \\ &= \ln\bigl((V1-Vt)/V1\bigr)*(Rcal\|Rid)*Tcal\big/\ln\bigl((V1-Vt)/V1\bigr)/Rcal \\ &= (Rcal\|Rid)*Tcal/Rcal \\ &= \bigl((Rcal*Rid)/(Rcal+Rid)\bigr)*Tcal/Rcal\end{aligned}$$

In an example, the last equation for Tid may be utilized in any suitable manner to solve for the resistance, Rid, of ID resistor 206. For example, the resistance, Rid, may be determined based on equation 6 below:

$$Rid=Rcal*Tid/(Tcal-Tid) \quad \text{EQ. 6}$$

In certain examples, the calculation of the calibration time, Tcal, to charge capacitor 316 and the calculation of the inventory time, Tid, to charge the capacitor may be utilized to determine a specific resistance, Rid, for resistor 206 without the capacitance, C, of capacitor 316 and the threshold voltage, Vt, affecting the determined resistance. For example, as seen in equation 6 above, capacitance, C, and threshold voltage, Vt, both dropped out of the final equation for resistance, Rid, of resistor 206. In this example, the tolerance variations of these values do not affect the calculations. In this example, capacitance, C, and threshold voltage, Vt, have been calibrated out via the inventory and calibration modes of calibration circuitry 300. In an example, the resolution of bit strapping from ID resistor 206 is based on a resolution of counter 212 with respect to counting Tcal and Tid.

Upon determination or detection of the resistance, Rid, of ID resistor 206, SOC 202 may compare the Rid with Rids in ID table 216 to determine an ID of a corresponding component. In certain examples, each ID resistor 206 of FIG. 2, may be utilized to provide a different multi-bit strapping to identify different components.

In an example, the capacitance, C, of capacitor 316 may be rated with a very loose tolerance, such as plus or minus twenty percent, and as a result the capacitance, C, may be very inaccurate. In this example, the capacitance, C, is calibrated out of the determination of resistance, Rid, such that any variations or inaccuracies of the capacitance may not affect the accuracy of Rid. In certain examples, the threshold voltage, Vt, may be based on a high input voltage, Vih, of SOC 202. In an example, the high input voltage, Vih, may vary from device to device and may vary under different temperature conditions, and as a result the threshold voltage may vary. Based on variations in the threshold voltage, Vt, this variable may also be calibrated out of the determination of resistance, Rid, of resistor 206.

In certain examples, the removal of capacitance, C, and threshold voltage, Vt, from the determination of resistance, Rid, of ID resistor 206 improves an information handling system, such as information handling system 200 of FIG. 2, that includes calibration circuitry 300 and the ID resistor. For example, the removal of the high tolerance components may calibrate calibration circuitry 300 to eliminate uncertainty variables including aging, tolerance, manufacturing variations, temperature changes, or the like. In an example, the components of calibration circuitry 300 enable an eight-bit strapping on a single RC_ID line, such as ID line 222 of FIG. 2 and ID line 322 of FIG. 3. Previous information handling systems without the calibration technique described herein may only get a three-bit strapping on an RC_ID line. Calibration circuitry 300 enables detection of multi-bit strap information using a single ID pin, such as ID pin 322, which in previous information handling systems would otherwise require multiple digital pins.

In an example, calibration circuitry 300 may utilize a single calibration resistor 314, or a series resistor network, that guarantees the required resolution of the resistance of ID resistor 206. In certain examples, SOC 202 may detect strapping information associated with a single ID resistor 206 in a purely digital solution as described herein with respect to setting calibration line 320 and ID line 322 to digital high or low states. In an example, SOC 202 may implement digital programming logic to calculate Rid, and to translate the measured resistance, Rid, to multi-bit strap information.

Figure 4:
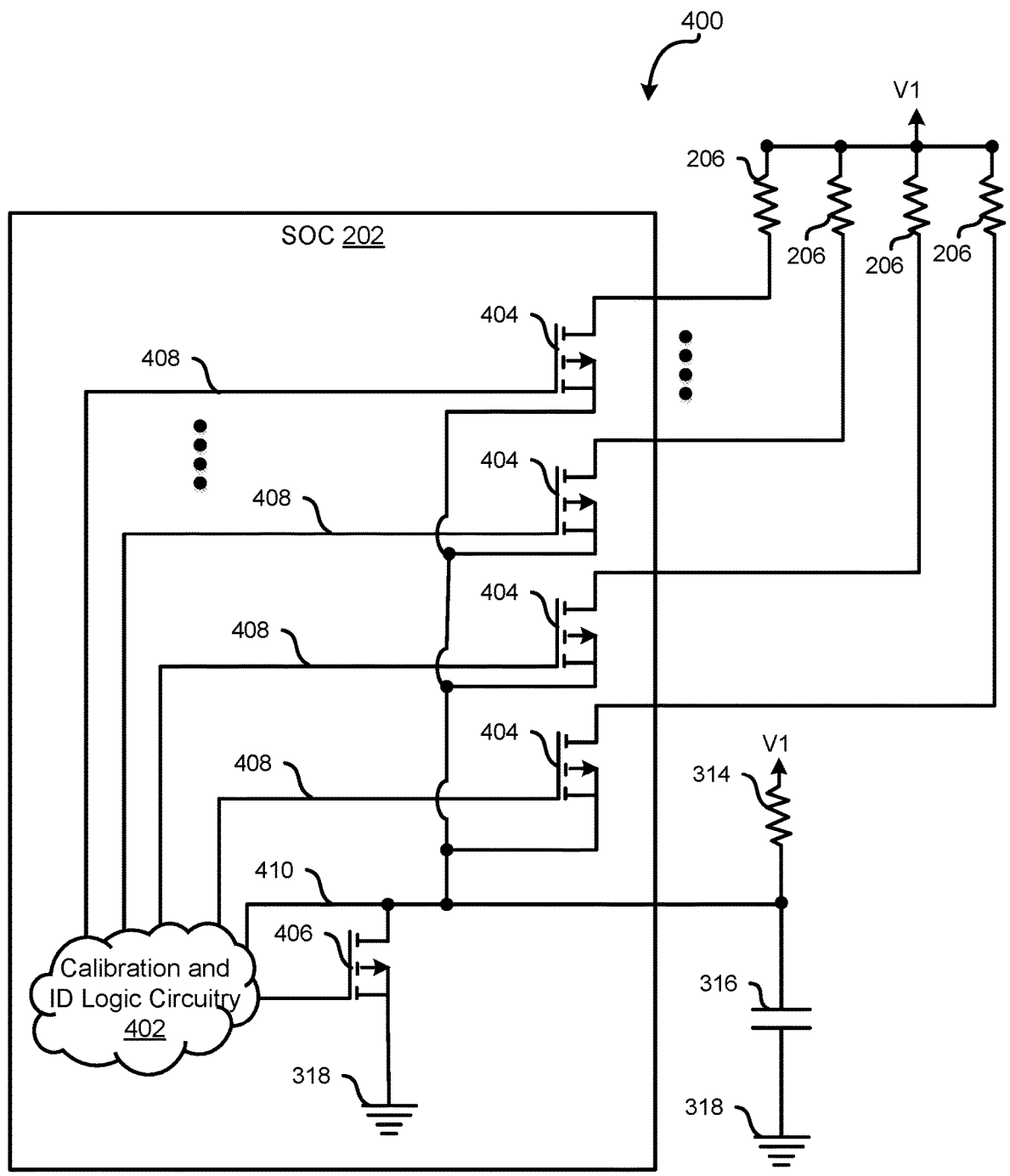
FIG. 4 is a schematic diagram of a portion of an information handling system according to at least one embodiment of the disclosure.

FIG. 4 illustrates a portion of an information handling system 400 according to at least one embodiment of the disclosure. Information handling system 400 may be any suitable information handling system including, but not limited to, information handling system 200 of FIG. 2. Information handling system 400 includes SOC 202 ID resistors 206, calibration resistor 314, capacitor 316, and voltage reference 318. SOC 202 includes calibration and ID logic circuitry 402, multiple transistors 404, transistor 406, ID select lines 408, and a calibration select line 410. In an example, transistors 404 may be utilized for selecting an ID line, and transistor 406 may be utilized to discharge capacitor 316. In an example, information handling system 400 may include additional components over those shown in FIG. 4 without varying from the scope of this disclosure. In certain examples, other variants of information handling system 400 may provide the same functionality without departing from the scope of this disclosure.

As described above with respect to FIGS. 2 and 3, calibration circuitry 402 may place the components of SOC 202 in either an inventory mode or a calibration mode. For example, in response to calibration line 410 being set to a low state and a particular ID select line 408 may be set to a high state, calibration circuitry may be placed in an inventory mode. While in the inventory mode or cycle, the high state of a ID select line 408 may cause the associated transistor 404 to place corresponding ID resistor 206 in parallel with calibration resistor 314. For example, transistor 404 may open and couple the associated ID resistor 206 between voltage reference V1 and a node coupled to calibration resistor 314.

In an example, voltage supply, V1, may be any suitable voltage, calibration resistor 314 may be any suitable known resistance, and capacitor 316 may be any suitable capacitance. In certain examples, ID resistor 206 may be any suitable resistance within a range of resistances and each resistance may correspond to a different multi-bit strapping identification value. In an example, the multi-bit strapping identification value may be an eight-bit identifier, such that the multi-bit strapping identification value may range from 0-255.

During an inventory cycle of the inventory mode, calibration and ID logic circuitry 402 of SOC 202 may provide a voltage to the gate of transistor 406, which in turn may discharge capacitor 316. In response to capacitor 316 being fully discharged, calibration and ID logic circuitry 402 of SOC 202 may open transistor 406 to place the node between calibration resistor 314 and capacitor 316 to an unknown or tri-state and may start counter with the calibration and ID logic circuitry, such as counter 212 of FIG. 2. Calibration circuitry 402 may then enable capacitor 316 to charge through the parallel combination of calibration resistor 314 and ID resistor 206. Based on capacitor 316 being charged to a threshold voltage while calibration circuitry 402 is in the inventory mode, SOC 202 may utilize counter 212 to determine an inventory time, Tid.

In an example, calibration circuitry 402 may assert a voltage on each ID select line 408 to place the components of SOC 202 in the calibration mode. In response, ID resistors 206 may be isolated from calibration resistor 314 and capacitor 316. In an example, the voltage on each of ID select lines may cause transistors 404 to open and ID resistor 206 is isolated from calibration circuitry 402. During a calibration cycle, calibration circuitry 402 may close transistor 406, which in turn may discharge capacitor 316. In response to capacitor 316 being fully discharged, calibration circuitry 402 may open transistor 406, which in turn may place the node between calibration resistor 314 and capacitor 316 in an unknown or tri-state and may start a counter, such as counter 212 of FIG. 2. Calibration circuitry 402 may then enable capacitor 316 to charge through calibration resistor 314. Based on capacitor 316 being charged to the threshold voltage while components of SOC 202 are in the calibration mode, calibration and ID logic circuitry 402 may utilize counter 212 to determine a calibration time, Tcal.

In certain examples, the calculation of the calibration time, Tcal, to charge capacitor 316 and the calculation of the inventory time, Tid, to charge the capacitor may be utilized to determine a specific resistance, Rid, for resistor 206 without the capacitance, C, of capacitor 316 and the threshold voltage, Vt, affecting the determined resistance. In this example, capacitance, C, and threshold voltage, Vt, have been calibrated out via the inventory and calibration modes of calibration circuitry 402. In an example, the resolution of bit strapping from ID resistor 206 is based on a resolution of counter 212 with respect to counting Tcal and Tid.

Figure 5:
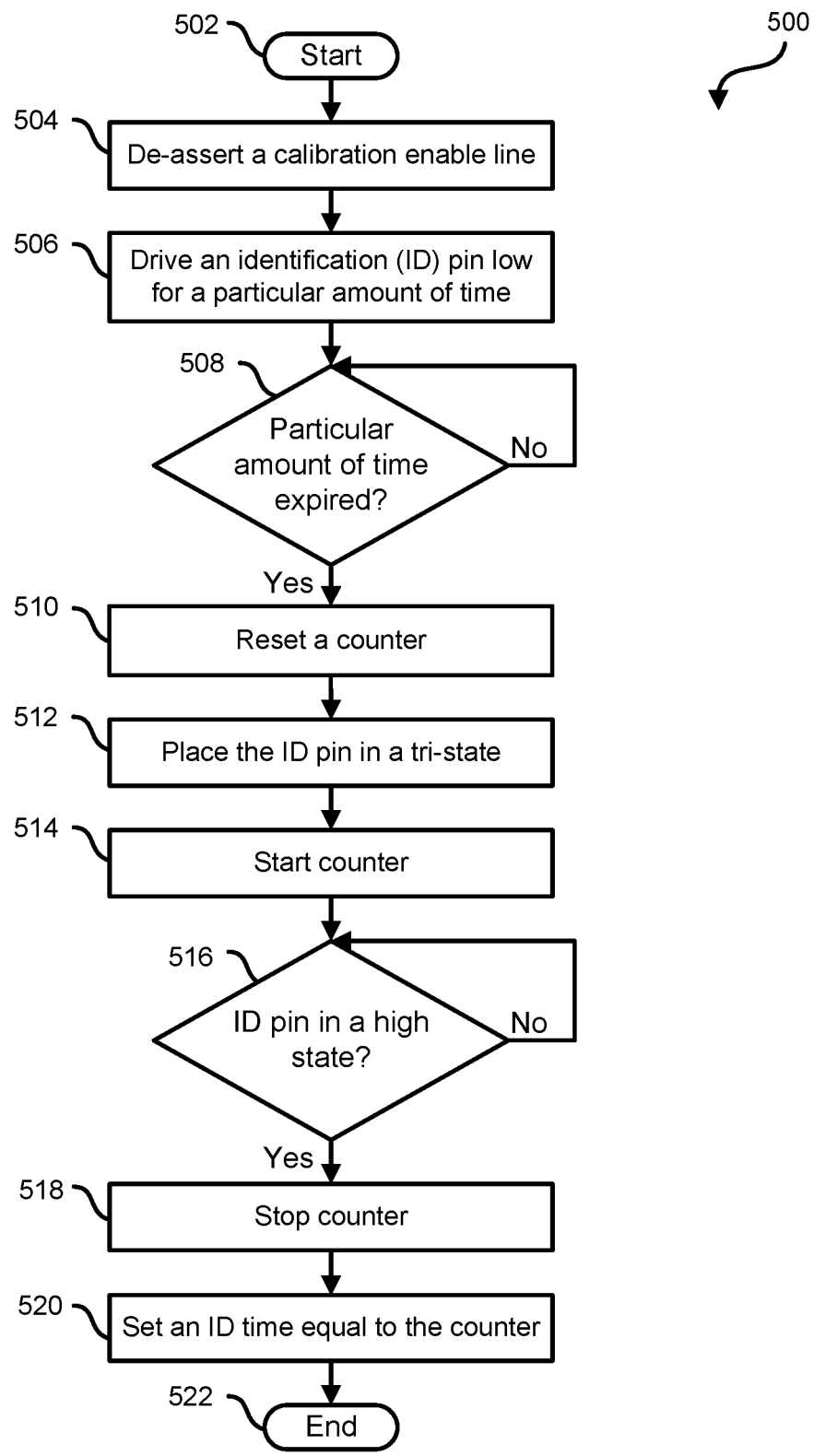
FIG. 5 is a flow diagram of a method for performing an inventory cycle of an identification resistor of a strapping circuit of an information handling system according to at least one embodiment of the current disclosure.

FIG. 5 is a flow diagram of a method for performing an inventory cycle of an identification resistor of a strapping circuit of an information handling system according to at least one embodiment of the current disclosure, starting at block 502. It will be readily appreciated that not every method step set forth in this flow diagram is always necessary, and that certain steps of the methods may be combined, performed simultaneously, in a different order, or perhaps omitted, without varying from the scope of the disclosure. FIG. 5 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 5.

At block 504, a calibration line is de-asserted. In an example, the calibration line may be de-asserted by setting the line to a digital low state. In response to the calibration line being set to the digital low state, calibration circuitry connected to the calibration line may enter an inventory mode. At block 506, an ID pin is driven to a digital low state for a particular amount of time. In an example, the particular amount of time may be any suitable amount of time to enable a capacitor of the calibration circuitry to fully discharge. At block 508, a determination is made whether the particular amount of time has expired.

In response to the particular amount of time expiring, a counter is reset at block 510. In an example, the counter may be part of a SOC connected to the calibration circuitry. At block 512, the ID pin is placed in a tri-state. In an example, the tri-state is an unknown state, such that the ID pin is not particularly set to a digital high state or to a digital low state. At block 514, the counter is started. At block 516, a determination is made whether the ID pin is in one digital state. In an example, the ID pin may be in the one digital state based on a capacitor connected to the ID pin being charged to a voltage above a particular threshold voltage. In certain examples, the capacitor may be charged through a parallel combination of a calibration resistor and an identification resistor. In response to the ID pin being in the one digital state, the counter is stopped at block 518. At block 520, an ID time, Tid, is set substantially equal to a value of the counter, and the flow ends at block 522.

Figure 6:
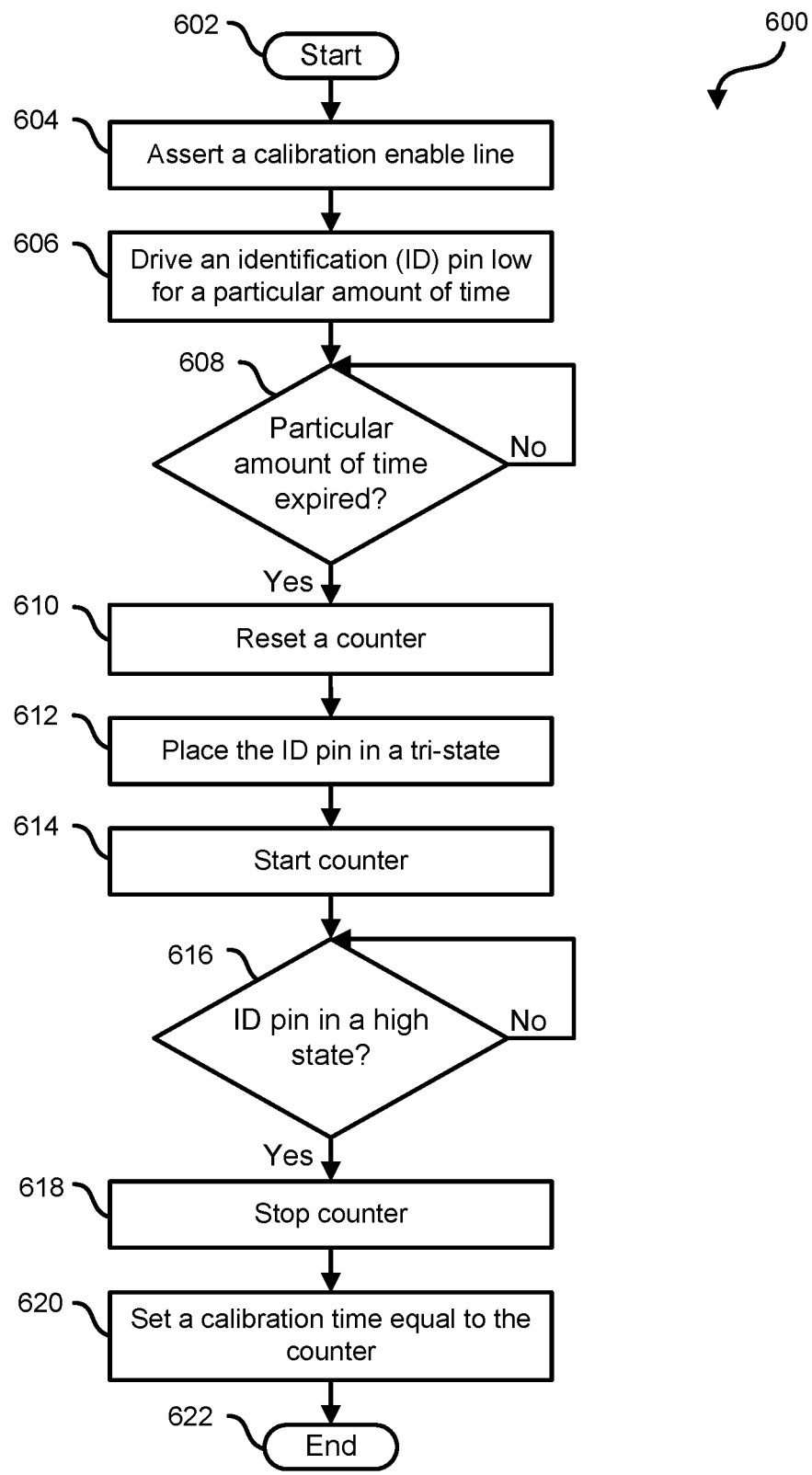
FIG. 6 is a flow diagram of a method for performing a calibration cycle of an identification resistor of a strapping circuit of an information handling system according to at least one embodiment of the current disclosure.

FIG. 6 is a flow diagram of a method for performing a calibration cycle of an identification resistor of a strapping circuit of an information handling system according to at least one embodiment of the current disclosure, starting at block 602. It will be readily appreciated that not every method step set forth in this flow diagram is always necessary, and that certain steps of the methods may be combined, performed simultaneously, in a different order, or perhaps omitted, without varying from the scope of the disclosure. FIG. 6 may be employed in whole, or in part, by information handling system 100 depicted in FIG. 1, information handling system 200 depicted in FIG. 2, or any other type of system, controller, device, module, processor, or any combination thereof, operable to employ all, or portions of, the method of FIG. 6.

At block 604, a calibration line is asserted. In an example, the calibration line may be asserted by setting the line to a digital high state. In response to the calibration line being set to the digital high state, calibration circuitry connected to the calibration line may enter a calibration mode. At block 606, an ID pin is driven to a digital low state for a particular amount of time. In an example, the particular amount of time may be any suitable amount of time to enable a capacitor of the calibration circuitry to fully discharge. At block 608, a determination is made whether the particular amount of time has expired.

In response to the particular amount of time expiring, a counter is reset at block 610. In an example, the counter may be part of a SOC connected to the calibration circuitry. At block 612, the ID pin is placed in a tri-state. In an example, the tri-state is an unknown state, such that the ID pin is not particularly set to a digital high state or to a digital low state. At block 614, the counter is started. At block 616, a determination is made whether the ID pin is in one digital state. In an example, the ID pin may be in the one digital state based on a capacitor connected to the ID pin being charge to a voltage above a particular threshold voltage. In certain examples, the capacitor may be charged through calibration resistor. In response to the ID pin being in the one digital state, the counter is stopped at block 618. At block 620, a calibration time, Tcal, is set substantially equal to a value of the counter, and the flow ends at block 622.

In an example, the Tid set in block 520 of FIG. 5 and Tcal set in block 620 of FIG. 6 may be utilized to calculate a resistance, Rid, of an ID resistor. In certain examples, the steps of FIG. 5 may be performed before or after the steps of FIG. 6 without varying from the scope of this disclosure.

Referring back to FIG. 1, the information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   an identification resistor;
   calibration circuitry coupled to the identification resistor, the calibration circuitry including a calibration resistor and a capacitor; and
   a system-on-a-chip (SOC) coupled to the calibration circuitry, the SOC to:
      determine a calibration amount of time to charge the capacitor to a voltage substantially equal to a threshold voltage through the calibration resistor;
      determine an inventory amount of time to charge the capacitor to the voltage substantially equal to the threshold voltage through a parallel combination of the calibration resistor and the identification resistor; and
      determine bit strapping information based on the inventory amount of time and the calibration amount of time, wherein the bit strapping information corresponds to an identification for a component in the information handling system.

2. The information handling system of claim 1, wherein the SOC further to set a calibration line to a first digital state, wherein the calibration circuitry enters an inventory mode based on the calibration line being in the first digital state.

3. The information handling system of claim 2, wherein the SOC further to set a calibration line to a second digital state, wherein the calibration circuitry enters a calibration mode based on the calibration line being in the second digital state.

4. The information handling system of claim 3, while the calibration circuitry is in the calibration mode, the identification resistor is isolated from the calibration circuitry.

5. The information handling system of claim 1, while the calibration circuitry is in an inventory mode, the SOC further to set an identification line to a digital tri-state prior to the determination of the inventory amount of time to charge the capacitor to the voltage substantially equal to the threshold voltage.

6. The information handling system of claim 5, wherein the capacitor is coupled in between the identification line and a reference voltage.

7. The information handling system of claim 5, while the calibration circuitry is in the inventory mode, the SOC further to reset a counter prior to the identification line being set to the digital tri-state.

8. The information handling system of claim 7, while the calibration circuitry is in the inventory mode, the SOC further to stop the counter in response to the capacitor being charged to the voltage substantially equal to the threshold voltage, and to set the inventory amount of time to the value of the counter.

9. The information handling system of claim 1, wherein the determination of a resistance of the identification resistor remains constant for different capacitances of the capacitor.

10. A method comprising:
    determining, by a system-on-a-chip (SOC), a calibration amount of time to charge a capacitor to a voltage substantially equal to a threshold voltage through a calibration resistor, wherein calibration circuitry of an information handling system includes the calibration resistor and the capacitor, wherein the calibration circuitry is coupled to an identification resistor of the information handling system;
    determining an inventory amount of time to charge the capacitor to the voltage substantially equal to the threshold voltage through a parallel combination of the calibration resistor and the identification resistor; and
    determining bit strapping information based on the inventory amount of time and the calibration amount of time, wherein the bit strapping information corresponds to an identification for a component in the information handling system.

11. The method of claim 10, while the calibration circuitry is in an inventory mode, the method further comprises setting an identification line to a digital tri-state prior to the determination of the inventory amount of time to charge the capacitor to the voltage substantially equal to the threshold voltage.

12. The method of claim 11, while the calibration circuitry is in the inventory mode, the method further comprises resetting a counter prior to the identification line being set to the digital tri-state.

13. The method of claim 12, while the calibration circuitry is in the inventory mode, the method further comprises:

stopping the counter in response to the capacitor being charged to the voltage substantially equal to the threshold voltage; and setting the inventory amount of time to the value of the counter.

14. The method of claim 10, wherein the determining of a resistance of the identification resistor remains constant for different capacitances of the capacitor.

15. The method of claim 10, wherein the method further comprises setting a calibration line to a first digital state, wherein the calibration circuitry enters the inventory mode based on the calibration line being in the first digital state.

16. The method of claim 15, while the calibration circuitry is in the calibration mode, the method further comprising isolating the identification resistor from the calibration circuitry.

17. A method comprising:
determining, by a system-on-a-chip (SOC), a calibration amount of time to charge a capacitor to a voltage substantially equal to a threshold voltage through a calibration resistor, wherein a calibration circuit of an information handling system includes the calibration resistor and the capacitor, wherein the calibration circuit is coupled to an identification resistor of the information handling system;

determining an inventory amount of time to charge the capacitor to the voltage substantially equal to the threshold voltage through a parallel combination of the calibration resistor and the identification resistor;

determining a resistance of the identification resistor based on the inventory amount of time and the calibration amount of time;

comparing the resistance of the identification resistor to resistances in an identification table;

determining bit strapping information in the identification table corresponding to the determined resistance, wherein the bit strapping information corresponds to an identification for a component in the information handling system; and storing the bit strapping information in a memory of the SOC.

18. The method of claim 17, wherein the method further comprises setting a calibration line to a first digital state, wherein the calibration circuit enters the inventory mode based on the calibration line being in the first digital state.

19. The method of claim 17, while the calibration circuit is in a calibration mode, the method further comprising isolating the identification resistor from the calibration circuitry.

20. The method of claim 17, wherein the determining of the resistance of the identification resistor remains constant for different capacitances of the capacitor.

* * * * *